US009116276B2

(12) United States Patent
Montfort et al.

(10) Patent No.: US 9,116,276 B2
(45) Date of Patent: Aug. 25, 2015

(54) ROOM DIVIDER WITH ILLUMINATED LIGHT GUIDE BLIND BLADE

(75) Inventors: Vincent Johannes Jacobus van Montfort, Aachen (DE); Hendrikus albertus adrianus maria de Ruijter, Shanghai (CN); Bennie Simpelaar, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 553 days.

(21) Appl. No.: 13/375,247

(22) PCT Filed: May 31, 2010

(86) PCT No.: PCT/IB2010/052409
§ 371 (c)(1),
(2), (4) Date: May 4, 2012

(87) PCT Pub. No.: WO2010/140103
PCT Pub. Date: Dec. 9, 2010

(65) Prior Publication Data
US 2012/0212977 A1   Aug. 23, 2012

(30) Foreign Application Priority Data

Jun. 2, 2009   (CN) .......................... 2009 1 0142730

(51) Int. Cl.
| | |
|---|---|
| *E06B 9/36* | (2006.01) |
| *F21V 8/00* | (2006.01) |
| *E06B 9/386* | (2006.01) |
| *F21V 21/34* | (2006.01) |
| *F21V 33/00* | (2006.01) |
| *E06B 9/24* | (2006.01) |
| *F21S 10/00* | (2006.01) |
| *F21Y 101/02* | (2006.01) |

(52) U.S. Cl.
CPC ................ *G02B 6/0091* (2013.01); *E06B 9/36* (2013.01); *E06B 9/386* (2013.01); *F21V 21/34* (2013.01); *F21V 33/0016* (2013.01); *E06B 2009/247* (2013.01); *F21S 10/00* (2013.01); *F21Y 2101/02* (2013.01); *G02B 6/0068* (2013.01); *G02B 6/0075* (2013.01); *G02B 6/0083* (2013.01); *G02B 6/0095* (2013.01)

(58) Field of Classification Search
CPC . A47H 15/00; A47H 23/10; A47H 2023/006; F21S 4/008; F21V 2008/006; G02B 6/0011; G02B 6/0013
See application file for complete search history.

(56) References Cited

U.S. PATENT DOCUMENTS

| | | | | |
|---|---|---|---|---|
| 2,503,441 | A * | 4/1950 | Kamm | ...................... 160/172 V |
| 4,918,578 | A * | 4/1990 | Thompson | .................... 362/634 |
| 4,965,701 | A * | 10/1990 | Voland | .......................... 362/565 |
| 5,142,133 | A | 8/1992 | Kern et al. | |
| 6,259,218 | B1 | 7/2001 | Kovach et al. | |
| 6,371,623 | B1 * | 4/2002 | Toyoda | ......................... 362/608 |

(Continued)

FOREIGN PATENT DOCUMENTS

| | | |
|---|---|---|
| CN | 2036382 | 4/1984 |
| CN | 201137447 | 10/2008 |

(Continued)

Primary Examiner — Ismael Negron

(57) ABSTRACT

An apparatus includes a first holder configured to hold a light source and having an interface for receiving power to feed to said light source, 1 and a light guide plate configured to be coupled to said first holder and guide light emitted by the light source out from at least one surface of the light guide plate.

11 Claims, 5 Drawing Sheets

(56) References Cited

U.S. PATENT DOCUMENTS

| | | | |
|---|---|---|---|
| 6,628,885 B1* | 9/2003 | Wilkie et al. | 385/147 |
| 6,877,548 B1* | 4/2005 | Chartier et al. | 160/178.1 V |
| 7,036,960 B1 | 5/2006 | Gretz | |
| 7,234,853 B2* | 6/2007 | Givoletti | 362/556 |
| 7,374,315 B2* | 5/2008 | Dorsey et al. | 362/294 |
| 7,607,815 B2 | 10/2009 | Pang | |
| 7,617,857 B2* | 11/2009 | Froese | 160/10 |
| 2005/0237741 A1* | 10/2005 | Chang | 362/249 |
| 2006/0082987 A1* | 4/2006 | Dorsey et al. | 362/103 |
| 2006/0127002 A1* | 6/2006 | Franklin et al. | 385/31 |
| 2008/0053937 A1* | 3/2008 | Chen | 211/105.3 |
| 2008/0185918 A1 | 8/2008 | Metz et al. | |
| 2012/0057346 A1* | 3/2012 | Spanjaard | 362/249.02 |

FOREIGN PATENT DOCUMENTS

| | | | | |
|---|---|---|---|---|
| EP | 1076205 A1 * | 2/2001 | | F21V 8/00 |
| JP | 0877818 A | 3/1996 | | |
| JP | 2001325811 A | 11/2001 | | |
| JP | 2002201880 | 7/2002 | | |
| JP | 2005310696 A | 11/2005 | | |
| JP | 2008135387 A | 6/2008 | | |
| JP | 2008540884 A | 11/2008 | | |
| JP | 2009046933 A | 3/2009 | | |
| JP | 2009098313 A | 5/2009 | | |
| WO | 9514843 | 6/1995 | | |
| WO | 2008012702 A1 | 1/2008 | | |
| WO | 2008133500 A2 | 11/2008 | | |

* cited by examiner

ROOM DIVIDER WITH ILLUMINATED LIGHT GUIDE BLIND BLADE

FIELD OF THE INVENTION

The invention relates to an apparatus and a system for separating space, particularly to an apparatus used as a workspace divider, room divider or a blade of a blind, and a window blind system.

BACKGROUND OF THE INVENTION

Blinds are widely used all over the world for their light-blocking and decoration functions. There are two typical types of traditional blinds, horizontal and vertical. Normally, they are hung behind the window on the indoor side and light passing through the blinds can be adjusted through adjusting the angle of rotation of the blind blades from totally light-blocking to totally light-transmitting. Blades of a blind also can be piled to one side of the window area when they are not being used.

SUMMARY OF THE INVENTION

Light guide technology may be integrated into the blinds, resulting in blinds that can be used for illumination purposes. The illuminating blinds can be used for decorative purposes, atmosphere creation purposes, functional lighting, or signage, etc.

For a vertical blind, the light source will most likely be on the top side. A problem is how the light source should be integrated in the system, and connected to the power supply; how the heat can be transported to a heat sink, and how the blades remain rotatable, stackable and still visually attractive.

Also easy assembly during installation on site is an important aspect to be incorporated in the system design. Once a system is installed, a repair action should be very simple to perform.

The present invention aims to provide an apparatus, which can be used as a blade of a window blind, as a screen, a room divider and a workspace divider, etc.

According to an embodiment of the present invention, there is provided an apparatus, comprising:

a first holder, configured to hold a light source and comprising an interface for receiving power to feed to said light source; and a light guide plate, configured to be coupled to said first holder and guide light emitted by said light source out from at least one surface of said light guide plate.

The advantage of the applied apparatus is the separation of the power source and the light source. The light source is integrated into the apparatus and the power can be easily fed to the light source via the interface of the first holder.

The interface of the first holder can be a UTP interface or a USB interface or a metal coil.

In an embodiment, the first holder further comprises a heat sink for absorbing and dissipating heat produced by the light source.

In an embodiment, the first holder further comprises a drive module for driving the light source. The drive module may further have at least one programmable logic unit, configured to be programmed to configure parameters of said light source.

By using the programmable unit, the apparatus for separating space can be easily customized. And each apparatus can be programmed separately.

In an embodiment, the apparatus for separating space further comprises a runner for coupling to a rail and the first holder can be coupled to the runner. One detailed implementation of such an apparatus can be a blade of a blind. A blind comprising a plurality of such apparatus can be easily assembled, rotated and stacked.

In an embodiment, the apparatus for separating space further comprises a flexible circuit conductor for receiving power to feed to said light source, especially when a plurality of said apparatus for separating space are connected together. The flexible circuit conductor can be coupled to the interface of the first holder or can be coupled to the runner. In the latter case, the first holder is electrically coupled to the runner via the interface. By using the flexible circuit conductor, a plurality of such apparatus are easily rotatable and stackable. In a situation of a flexible circuit conductor coupled to the runner, since the top half or all of the runner can be covered by the box of a rail, the flexible circuit conductor can be also invisible, thus giving the apparatus for separating space a visually attractive appearance.

DESCRIPTION OF THE DRAWINGS

The above and other objects and features of the present invention will become more apparent from the following detailed description considered in connection with the accompanying drawings, in which.

The same reference numerals are used to denote similar parts throughout the Figures.

DETAILED DESCRIPTION

Figure 1:
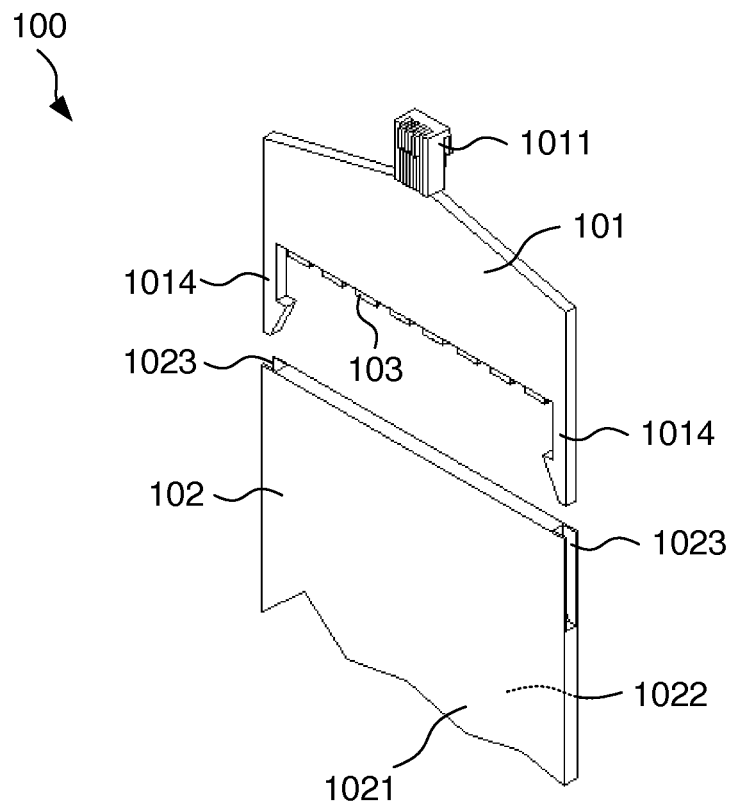
FIG. 1 shows a schematic view of an apparatus 100 for separating space according to an embodiment of the present invention.
Figure 2:
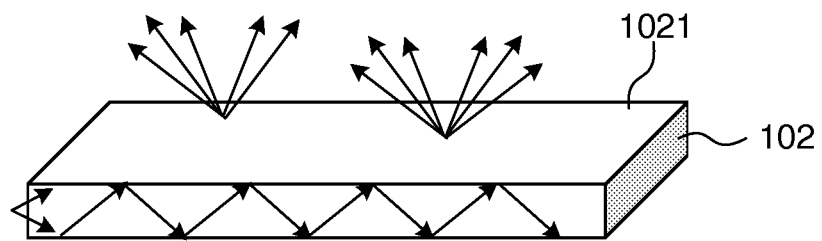
FIG. 2 shows a schematic view of the optical path of light exiting the surface 1021/1022 of the light guide plate 102 in FIG. 1.

FIG. 1 shows a schematic view of an apparatus 100 for separating space according to an embodiment of the present invention. In FIG. 1, the apparatus 100 for separating space comprises a first holder 101 and a light guide plate 102. The first holder 101 is used for holding a light source 103 and comprises an interface 1011 for receiving power to feed to the light source 103, e.g. the interface 1011 is electrically connected to the light source 103 on the inner side of the first holder 101. The light guide plate 102 is coupled to the first holder 101 and guides light emitted by the light source 103 out from the surface 1021 and/or 1022 of the light guide plate 102, as shown in FIG. 2. Usually, the light source 103 is placed on the lower side of the first holder 101 and emits light towards the light guide plate 102. The light source 103 may comprise a plurality of LEDs and/or OLEDs, etc. Each of the LEDs or OLEDs may have different or same parameters. For example, each LED may emit light of a different color or different intensity.

For simplicity, FIG. 2 only shows schematically an optical path of the light exiting from the surface 1021 of the light guide plate 102.

Figure 1A:
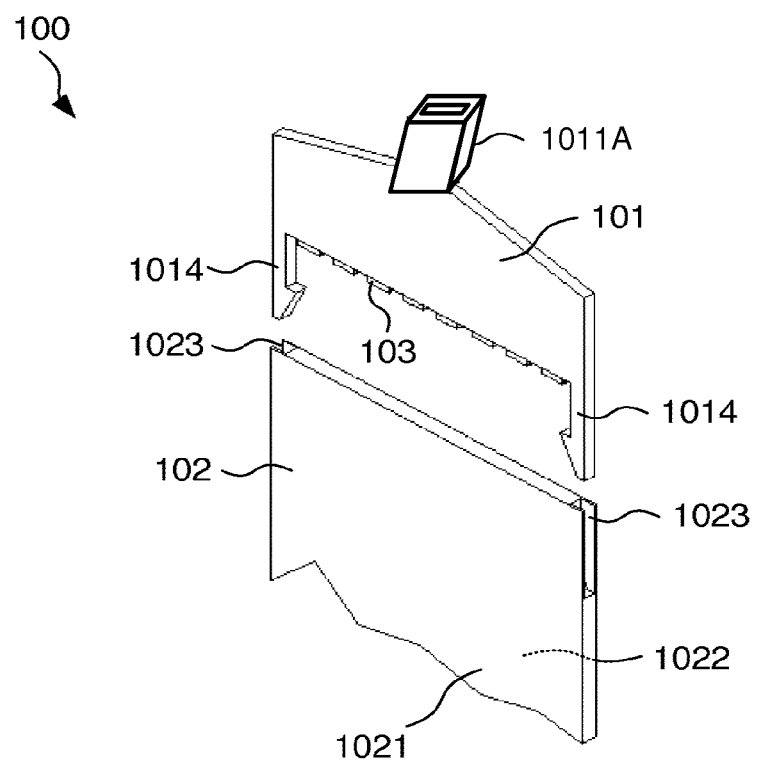
FIG. 1A shows a schematic view of an apparatus 100 for separating space according to an embodiment of the present invention.

The interface 1011 may be a standard interface or a user-defined interface. In an embodiment, the interface 1011 is a UTP (Unshielded Twisted Pair) or as shown in FIG. 1A a USB (Universal Serial Bus) interface 1011A. The UTP interface is also referred to as a RJ-45 interface. The interface 1011 can also be a serial interface or a parallel interface such as that of a computer.

In an embodiment, the interface 1011 can also be a metal coil for receiving power to feed the light source 103. The metal coil is a secondary coil (or pick up coil) of a transformer. It receives energy from the first coil of a transformer. So the light source 103 can be powered wirelessly. If the light source 103 is DC powered, the interface 1011 may further comprise an AC/DC converter for converting the AC voltage output by the secondary coil into a DC voltage to feed to the light source 103. If use is made of the drive module 1013, which will be elaborated in the following, the AC/DC converter can also be located on the drive module 1013.

Figure 3:
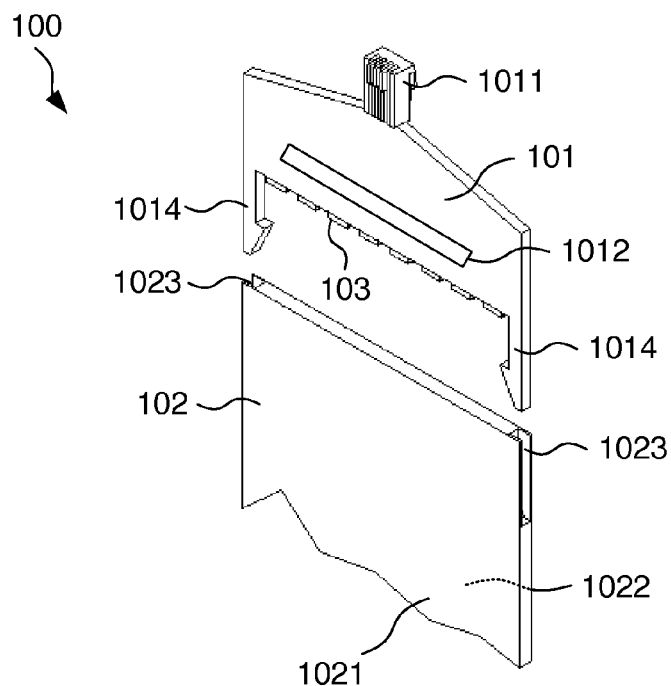
FIG. 3 shows a schematic view of an apparatus 100 for separating space according to another embodiment of the present invention.

The first holder 101 may further have a heat sink 1012 for absorbing and dissipating heat produced by the light source 103. In an embodiment, the heat sink 1012 is located closely above the light source 103, as shown in FIG. 3. As known by those skilled in the art, the material and shape of the heat sink 1012 can be various and the most common design of a heat sink is a metal device with many fins.

Figure 4:
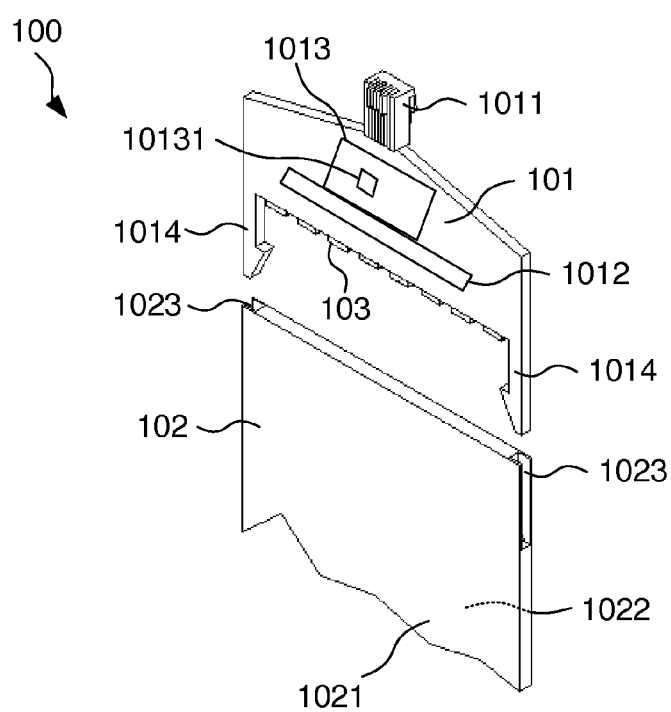
FIG. 4 shows a schematic view of an apparatus 100 for separating space according to yet another embodiment of the present invention.

The first holder 101 may further comprise a drive module 1013 for driving the light source 103, as shown in FIG. 4. In an embodiment, the drive module 1013 comprises at least one programmable logic unit 10131 for configuring the parameters of the light source 103, such as the color of the light, lighting time, lighting period, reaction to ambient input with some sensors like a temperature sensor, light intensity sensor, sound sensor etc, which are integrated, or reaction to neighbouring apparatus 100 when a plurality of such apparatus 100 are connected together. This makes for dynamic behavior of the light emitted by the light source 103. And by using the at least one programmable unit 10131, the lighting of the apparatus 100 is easily customized. Each apparatus 100 can be programmed separately.

The at least one programmable logic unit 10131 can be programmed by a computer via the interface 1011. In an embodiment, the at least one programmable logic unit 10131 can be programmed by a computer via another interface, which may be a user-defined interface or a standard interface.

For easy assembly and maintenance, such as cleaning and replacement etc., the first holder 101 and the light guide plate 102 are coupled through a plug-in connection. FIG. 1 and FIG. 3 both show the same plug-in connection, i.e. the click-fingers 1014 on the first holder 101 and the corresponding finger grooves 1023 in the light guide plate 102. It is to be understood that there are many plug-in variants besides the click fingers, such as the above mentioned UTP or USB interface or other mechanical plug-in variants etc.

Figure 5:
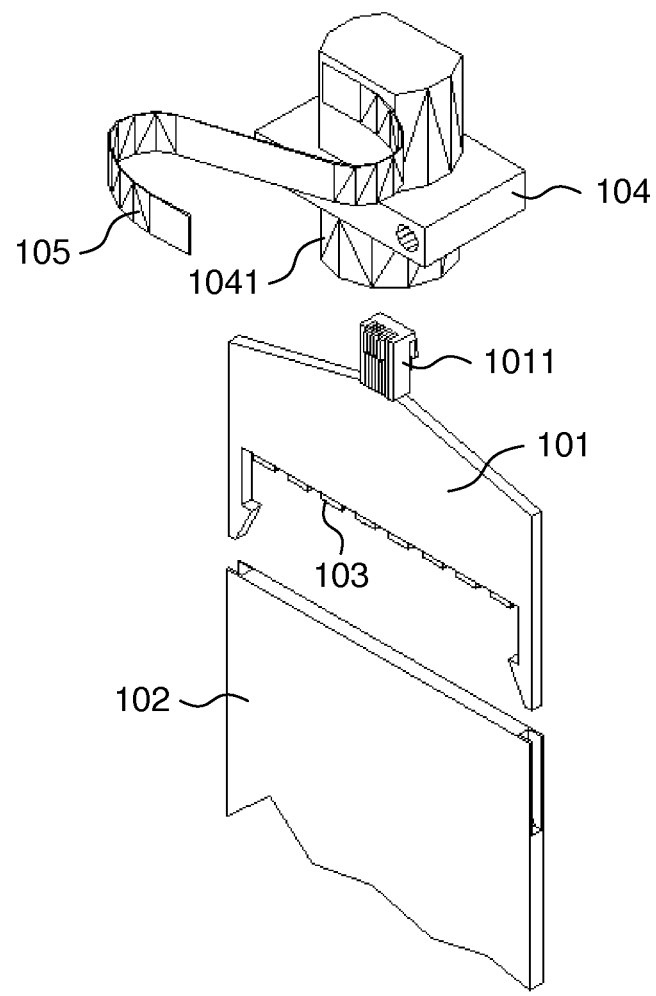
FIG. 5 shows a schematic view of an apparatus 100 for separating space comprising a runner according to another embodiment of the present invention.

The apparatus 100 can be used as a room divider, a workspace divider or a blade of a window blind. In the case of being a blade of a blind, the apparatus 100 may further comprise a runner 104 for coupling to a rail. Then the first holder 101 is coupled to the runner 104, as shown in FIG. 5. Usually, the top part of the runner 104 is configured to be coupled to a rail. The middle part of the runner 104 has the folding and rotation functions also found in existing runners. The bottom part has an interface 1041 for receiving the first holder 101. In an embodiment, the first holder 101 and the runner 104 are coupled via the interface 1011. In such a situation, the interface 1041 on the lower side of the runner 104 matches the interface 1011. Of course, the first holder 101 and the runner 104 can be coupled via another mechanical interface (not shown in the Figures). If the first holder 101 and the light guide plate 102 are heavy, a robust mechanical interface may be required for obtaining a strong pull force.

In one embodiment, the runner 104 can further comprises a metal coil for receiving power to feed to the light source 103. The metal coil is a secondary coil of a transformer. It receives energy from the first coil of a transformer. The runner 104 is electrically coupled to the first holder 101 via the interface 1011. So the light source 103 can be powered wirelessly. If the light source 103 is DC powered, the runner 104 may further comprises an AC/DC converter for converting the AC voltage output by the secondary coil into a DC voltage to feed to the light source 103.

In another embodiment, the apparatus 100 for separating space may have a flexible circuit conductor 105 for receiving power to feed to the light source 103. The flexible circuit conductor 105 may be coupled to the interface 1011. If use is made of the runner 104, the flexible circuit conductor 105 may be coupled to the runner 104. In an embodiment, the flexible circuit conductor 105 is coupled to the top part of the runner 104, as shown in FIG. 5. The runner 104 and the first holder 101 are electrically coupled via the interface 1011 to provide power for the light source 103. The top part of the runner 104 has an interconnection location for the flexible circuit conductor 105 to be coupled by a connector, a solder connection, conductive glue etc. The interconnection location is electrically coupled to the interface 1041 on the inner side of the runner 104. By virtue of the flexibility of the flexible circuit conductor 105, the runner 104 can still fold and rotate as requested. From FIG. 6, it can also be seen that since the top half of the runner 104 is covered by the box 601 of the rail 602, the flexible circuit conductor 105 is also invisible, thus making the apparatus 100 visually attractive.

Figure 6:
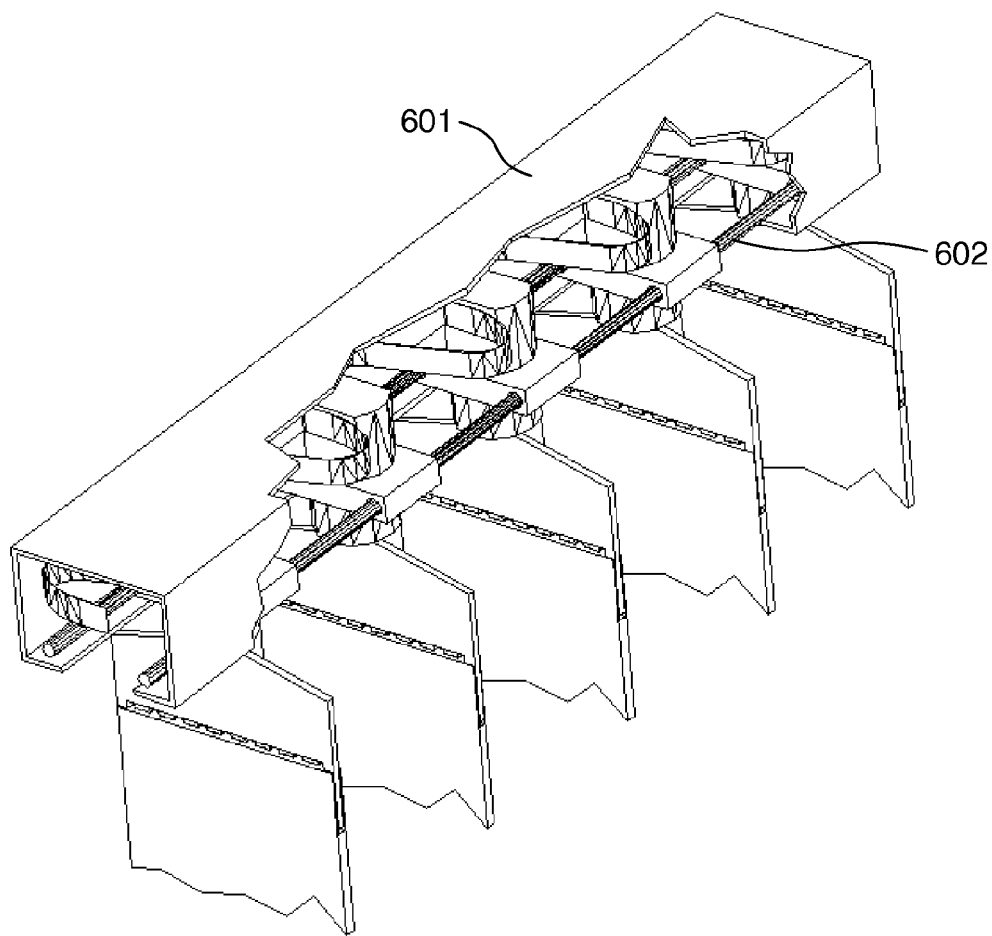
FIG. 6 shows a schematic view of a blind comprising a plurality of said apparatus 100 for separating space according to an embodiment of the present invention.

A system, such as a blind, can comprise at least one apparatus 100 as described. In case of a plurality of apparatus 100 are connected together, such as a detailed implementation of a blind, one end of the flexible circuit conductor 105 is coupled to the runner 104 or the interface 1011 of the first holder 101, the other end of the flexible circuit conductor 105 is coupled to the runner 104 or the interface 1011 of another apparatus 100, as shown in FIG. 6. In such situation, a plurality of apparatus 100 are connected together through a plurality of the flexible circuit conductors 105, so all the light sources 103 can be provided with power together. In an embodiment, the drive module 1013 may be located in the runner 104. The way of integration between the runner 104 and the first holder 101 could vary in dependence on the requested functionality. For example, the drive module 1013 could be in first holder 101 or in the runner 104, depending on which location is best in terms of production, costs, reliability, heat-management, etc.

Usually the light guide plate 102 is transparent. In an embodiment, the apparatus 100 for separating space can comprise a second holder (not shown in the Figures) for holding a fabric covering at least one surface of the light guide plate 102. The second holder may be located on the top side of the light guide plate 102, or on the bottom side of the first holder 101. The design of the second holder may vary. For example, the second holder may be a clamp.

The apparatus 100 in FIG. 1 to FIG. 5 can be made using a MID (Molded Interconnect Device) technology in which the electrical conductors and the mechanical construction are already integrated. The I²MC (Inmolded, Interconnection, Mechanical construction and Components) technology is a MID technology which enables also the integration of electrical components and other functions such as heat sinks With the integrated apparatus 100 made in I²MC technology, all functionalities mentioned above are achieved.

By using the apparatus 100 of the present invention, assembly and maintenance become very easy. The first holder 101 and the light guide plate 102 may be assembled in the factory. The length of the light guide plate 102 can be made to order. The first holder 101 could be made as a standard part. The runner 104 could also be made as a standard part.

When the apparatus 100 is used as a blade of a blind, the rail is made to the required length. At the installation side, the rail can be mounted in place and the runner 104 may be coupled to the rail in a traditional way. For the assembly of the runner 104 and the light guide plate 102 and the assembly of the light guide plate 102 and first holder 101 use can be of plug-in connections (making the mechanical and electrical interconnection in one go). For maintenance (cleaning, replacements, etc) the first holder 101 or the light guide plate 102 could simply be removed by plugging-out.

Figure 7:
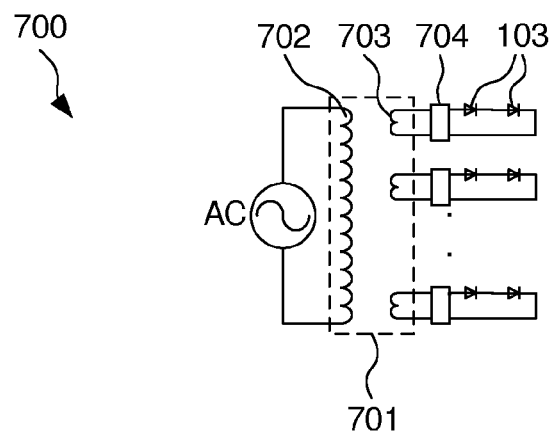
FIG. 7 shows a schematic view of a wireless feed circuit 700 for the light source 103.

FIG. 7 shows a schematic view of a wireless feed circuit 700 for the light source 103 when a plurality of apparatus 100 are connected together. In FIG. 7, the transformer 701 comprises the first (or the primary) metal coil 702 and the secondary metal coil 703. The first metal coil 702 is powered by an AC power supply. An AC/DC converter 704 is connected to the secondary metal coil to convert the AC voltage output by the secondary metal coil into a DC voltage and feed the DC voltage to the light source 103. As described above, the secondary metal coil can be located on the first holder 101 as the interface 1011 or located on the runner 104. Usually, the first metal coil is closely adjacent the secondary metal coil. For example, when the plurality of apparatus 100 are used as the blades of a blind, the first metal coil 702 can be mounted in the rail.

It should be noted that the above-described embodiments are for the purpose of illustration only and not to be construed as a limitation of the invention. All modifications which do not depart from the spirit of the invention are intended to be included within the scope of the appended claims In the claims, any reference signs placed between parentheses shall not be construed as limiting the claim. The word "comprising" does not exclude the presence of elements or steps not listed in a claim or in the description. The word "a" or "an" preceding an element does not exclude the presence of a plurality of such elements. In the apparatus claims enumerating several units, several of these units can be embodied by one and the same item of hardware or software. The use of the words first, second and third, etc., does not indicate any ordering. These words are to be interpreted as names.

The invention claimed is:

1. An apparatus comprising:
   a holder comprising an interface and a at least one light source, wherein the interface receives power to feed the light source;
   a light guide plate coupled to the holder wherein the light guide plate is arranged to guide light emitted by the light source out from at least one surface of the light guide plate;
   a runner arranged to couple to at least one rail, wherein the holder is further arranged to be coupled to the runner;
   a transformer comprising:
      a primary coil; and
      a secondary coil, and
   a flexible circuit conductor arranged to receive power to feed to the primary coil,
   wherein the secondary coil is arranged to receive power from the primary coil to feed power to the interface,
   wherein the holder is electrically coupled to the runner via the interface.

2. An apparatus according to claim 1, wherein the interface is a UTP interface.

3. An apparatus according to claim 1, wherein the holder further comprises a heat sink arranged to absorb and dissipate heat produced by the light source.

4. An apparatus according to claim 1, wherein-the flexible circuit conductor is arranged to be coupled to the runner and the holder is electrically coupled to the runner via the interface.

5. A system according to claim 1, wherein the system comprises a blind.

6. An apparatus according to claim 1, wherein the interface is a USB interface.

7. An apparatus according to claim 1, wherein the holder and the light guide plate are coupled through a plug-in connection.

8. An apparatus according to claim 7, wherein the holder and the light guide plate are coupled through click-fingers.

9. An apparatus according to claim 1, wherein the holder further comprises a drive module arranged to drive the light source.

10. An apparatus according to claim 9, wherein the drive module comprises at least one programmable logic unit to be programmed to configure parameters of the light source.

11. An apparatus according to claim 10, wherein the interface is further arranged to connect to a computer.

* * * * *